US009733126B2

(12) United States Patent
Kostka et al.

(10) Patent No.: US 9,733,126 B2
(45) Date of Patent: Aug. 15, 2017

(54) DEVICE AND METHOD FOR MEASURING A COMPLEXLY FORMED OBJECT

(71) Applicant: Fraunhofer-Gesellschaft zur Foerderung der Angewandten Forschung e.V., Munich (DE)

(72) Inventors: Guenther Kostka, Erlangen (DE);
Peter Schmitt, Erlangen (DE);
Christian Huegel, Wendelstein (DE);
Ralf Goldstein, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 350 days.

(21) Appl. No.: 14/256,749

(22) Filed: Apr. 18, 2014

(65) Prior Publication Data

US 2014/0211001 A1    Jul. 31, 2014

Related U.S. Application Data

(63) Continuation of application No. PCT/EP2012/061871, filed on Jun. 20, 2012.
(Continued)

(51) Int. Cl.
*G01J 3/50* (2006.01)
*H04N 7/18* (2006.01)
(Continued)

(52) U.S. Cl.
CPC .............. *G01J 3/50* (2013.01); *G01B 11/245* (2013.01); *G01B 11/2513* (2013.01);
(Continued)

(58) Field of Classification Search
None
See application file for complete search history.

(56) References Cited

U.S. PATENT DOCUMENTS 5,054,918 A    10/1991    Downing et al.
5,428,447 A *   6/1995    Toida ..................... G02B 26/10
356/432
(Continued)

FOREIGN PATENT DOCUMENTS

DE          4101921          8/1991
WO       2004111571 A1    12/2004

*Primary Examiner* — Christopher S Kelley
*Assistant Examiner* — Kaitlin A Retallick
(74) *Attorney, Agent, or Firm* — Perkins Coie LLP;
Michael A. Glenn

(57) ABSTRACT

A device for measuring a complexly formed object includes a plurality of light-section measuring devices, a rotator for causing a rotation between the complexly formed object and the plurality of light-section measuring devices around a rotation axis, wherein each of the plurality of light-section measuring devices is configured to generate a respective fan beam in a respective fan plane, wherein the fan planes are arranged such that the rotation axis extends within each of the fan planes, wherein the plurality of light-section measuring devices is configured such that the fan beams are directed to the complexly formed object from different fan directions which, when projected into a common plane through which the rotation axis extends, by rotation around the rotation axis, differ from each other.

16 Claims, 7 Drawing Sheets

Related U.S. Application Data

(60) Provisional application No. 61/550,130, filed on Oct. 21, 2011.

(51) Int. Cl.
    *G01B 11/245*     (2006.01)
    *G01B 11/25*     (2006.01)

(52) U.S. Cl.
    CPC .......... *G01B 11/2518* (2013.01); *G01J 3/501* (2013.01); *H04N 7/18* (2013.01)

(56) References Cited

U.S. PATENT DOCUMENTS

| | | |
|---|---|---|
| 5,747,822 A | 5/1998 | Sinclair et al. |
| 2002/0054297 A1 | 5/2002 | Lee et al. |
| 2003/0057365 A1* | 3/2003 | Bennett .............. G01B 11/2518 250/234 |
| 2003/0066949 A1* | 4/2003 | Mueller ................ G01B 11/00 250/208.1 |
| 2004/0222987 A1 | 11/2004 | Chang et al. |
| 2005/0274913 A1 | 12/2005 | Sawada |
| 2010/0008588 A1 | 1/2010 | Moore et al. |
| 2011/0176147 A1* | 7/2011 | Marcil .................. G01B 11/25 356/602 |

\* cited by examiner

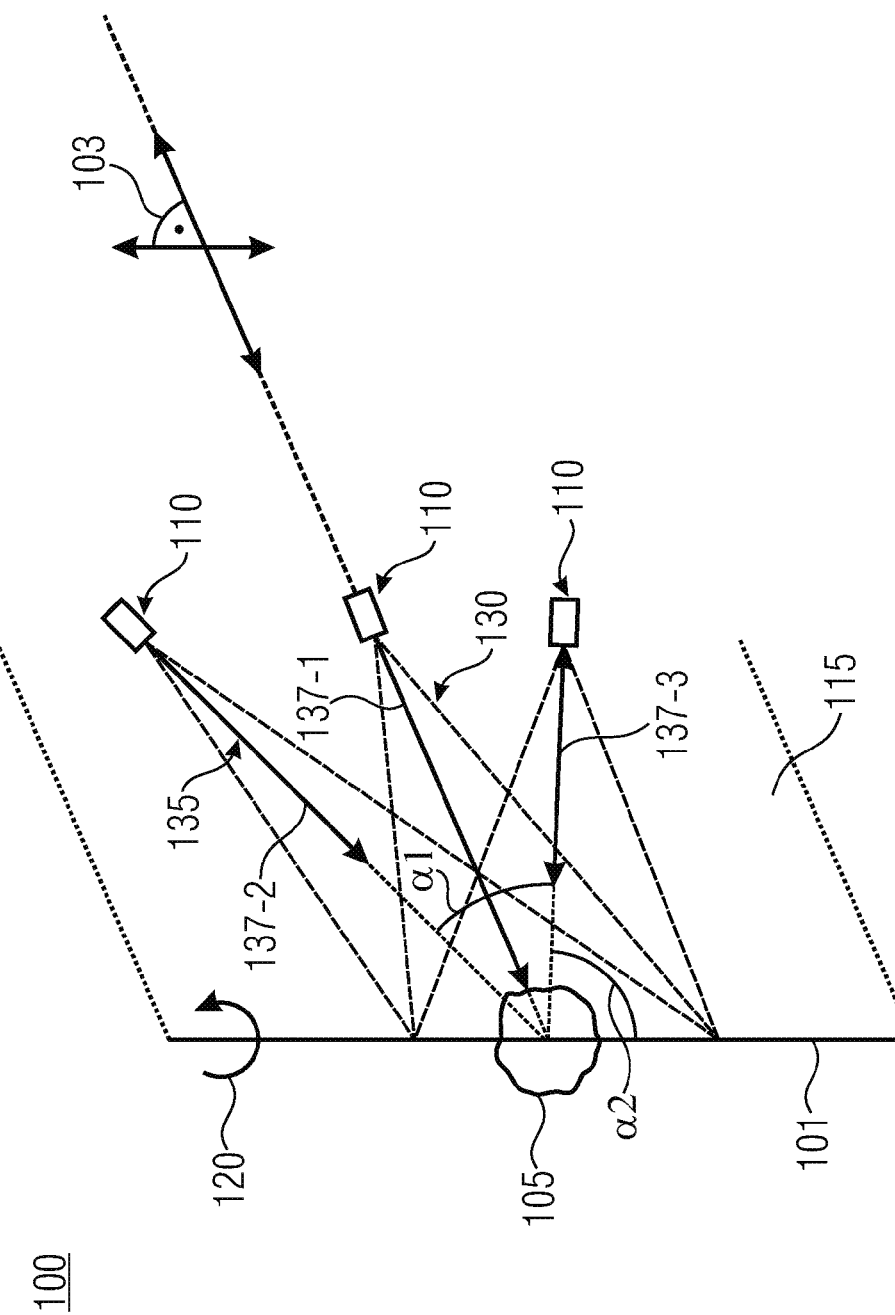

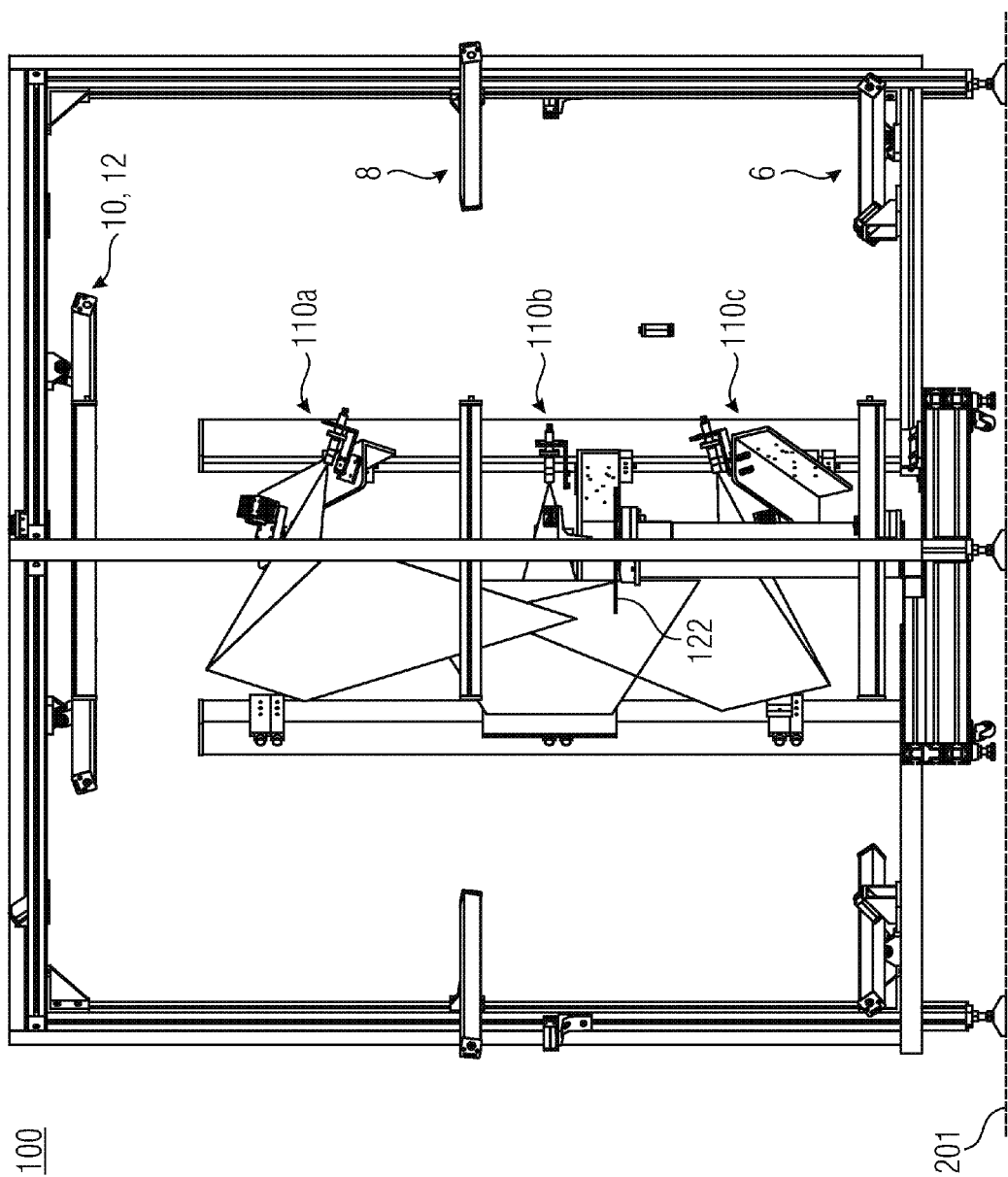

DEVICE AND METHOD FOR MEASURING A COMPLEXLY FORMED OBJECT

CROSS-REFERENCE TO RELATED APPLICATIONS

This application is a continuation of copending International Application No. PCT/EP2012/061871, filed Jun. 20, 2012, which is incorporated herein by reference in its entirety, and additionally claims priority from U.S. Patent Application No. 61/550,130, filed Oct. 21, 2011, which is also incorporated herein by reference in its entirety.

BACKGROUND OF THE INVENTION

Embodiments of the present invention relate to a concept for measuring a complexly formed object. Further embodiments of the invention relate to a device and a method for a contactless 3D color detection of plants.

For the assessment and/or phenotyping of plant varieties, i.e. for as complete of a description as possible of the specific properties of certain plants and their different genetic characteristics, the description of the plant architecture in general and in the entire course of development is also necessitated in addition to the description of the biological-chemical properties. The most important features of the plant architecture are the geometric properties of the leaves such as leaf area, orientation/position of the leaves, leaf angle, waviness, surface condition, etc. as well as the overall architecture of the plant. What is also essential for phenotypical characterization of plants is their reaction to the environmental conditions such as dryness, heat or disease, which is mainly characterized by a change in the outer shape of the plant as well as by a change in the color properties of the plant.

In the pharmaceutical industry, specific species of plants are employed for producing medicines or vaccines. In this context, there is a need for a high level of automation of the plant production, i.e. as little intervention by personnel as possible, and consequently fully automatic monitoring of plant growth so as to preclude any disruptions in the production as far as possible, or to detect and eliminate them at an early stage. One important aspect in this quality assurance of plant production comprises monitoring growth of the plants over their growth period as well as the early detection of states of stress or disease of individual specimens or of entire batches so as to be able to remove same from the production process.

The evaluation (assessment) and/or phenotyping of plant varieties with regard to the specific features (rate of growth, leaf area, disease resistance, stress resistance, etc.) so far has mainly been performed by trained personnel, who grade, in accordance with a predefined scheme, the various properties upon regular visual inspections of the plants. The largest range of application presumably is assessment in the open field. Laboratory phenotyping of plants so far has also mainly been based on visual inspection.

Since in the last few years there has been an emergence of a high demand for automatic measurement systems enabling objective and measurable evaluation of plants, individual suppliers have already offered automatic measurement systems. Almost all of said systems are suitable for the laboratory application, the plants to be examined being moved, via a transport system, in the plant pot to the measuring station. Here, detection of the plant is performed by means of a digital 2D camera system while the plant is being rotated on a rotation plate by using one or more cameras from different perspectives, which are subsequently reconstructed to form a 3-dimensional overall geometry. However, such systems are able to 3-dimensionally reconstruct relatively simple plant architectures only since with more complex plants, unambiguous association of pixels with the individual parts of the plants is not possible.

In the art, a portable 3D color measurement system for detecting young beet plants in the field has been developed. Said system is based on the laser light-section method in combination with a 2D color camera. It detects, during a linearly scanning measurement operation, the plants of a test lot, respectively, and provides as a result the leaf area for each plant. During the measuring operation, the system is positioned by persons on top of the test lot to be detected. Thus, it is possible to detect approximately one thousand plants per day.

Furthermore, a laboratory system for the automatic 3D color detection of Arabidopsis plants has been developed in the art. With said system it is possible to detect the Arabidopsis plants and to evaluate the various plants in terms of growth and of resistance to stress (heat, dryness). In this system, the test plants in pots, which are arranged on so-called trays, are detected by means of a linear scan process in that a laser line projector illuminates the entire tray by means of a laser fan beam perpendicularly from above and perpendicularly to the linear movement, while by means of two measuring cameras, which are arranged symmetrically with respect to each other and obliquely in relation to the laser fan beam, and with a color camera, the plants are detected with regard to the 3-dimensional shape and the color image, and are subsequently reconstructed. Due to the relatively simple measuring geometry, i.e. due to the laser light irradiation merely from above, said measuring system is suitable only for detecting plants of little complexity, e.g. of young Arabidopsis plants, which advantageously have a very flat leaf formation, i.e. the leaves are advantageously aligned in parallel with the potting compost.

SUMMARY

According to an embodiment, a device for measuring a complexly formed object may have: a plurality of light-section measuring devices; a rotator for causing a rotation between the complexly formed object and the plurality of light-section measuring devices around a rotation axis; wherein each of the plurality of light-section measuring devices is configured to generate a respective fan beam in a respective fan plane, wherein the fan planes are arranged such that the rotation axis extends within each of the fan planes; wherein the plurality of light-section measuring devices is configured such that the fan beams are directed onto the complexly formed object from fan directions which, when projected into a common plane through which the rotation axis extends, by rotation around the rotation axis, differ from each other.

According to another embodiment, a method for measuring a complexly formed object may have the steps of: providing a plurality of light-section measuring devices; causing a rotation between the complexly formed object and the plurality of light-section measuring devices around a rotation axis; wherein each of the plurality of light-section measuring devices is configured to generate a respective fan beam in a respective fan plane, wherein the planes are arranged such that the rotation axis extends within each of the fan planes; wherein the plurality of light-section measuring devices is configured such that the fan beams are directed onto the complexly formed object from fan directions which, when projected into a common plane through which the rotation axis extends, by rotation around the rotation axis, differ from each other.

According to another embodiment, a method for measuring a complexly formed object may have the steps of: providing a plurality of light-section measuring devices; causing a rotation between the complexly formed object and the plurality of light-section measuring devices around a rotation axis; wherein each of the plurality of light-section measuring devices is configured to generate a respective fan beam in a respective fan plane, wherein the planes are arranged such that the rotation axis extends within each of the fan planes; wherein the plurality of light-section measuring devices is configured such that the fan beams are directed onto the complexly formed object from fan directions which, when projected into a common plane through which the rotation axis extends, by rotation around the rotation axis, differ from each other; wherein the fan planes are co-planar and define the common plane; wherein each fan beam intersects the complexly formed object completely.

According to an embodiment of the present invention, a device for measuring a complexly formed object comprises a plurality of light-section measuring devices and a rotator for causing a rotation between the complexly formed object and the plurality of light-section measuring devices around a rotation axis. Here, each of the plurality of light-section measuring devices is configured to generate a respective fan beam in a respective fan plane, wherein the fan planes are arranged such that the rotation axis extends within each of the fan planes. Moreover, the plurality of light-section measuring devices is configured such that the fan beams are directed onto the complexly formed object from fan directions which, when projected into a common plane through which the rotation axis extends, by rotation around the rotation axis, differ from each other.

The basic idea underlying the present invention is that the just-mentioned improved and more efficient detection can be achieved if a rotation between the complexly formed object and a plurality of light-section measuring devices around a rotation axis is caused, and if fan planes of fan beams generated by the plurality of light-section measuring devices are arranged such that the rotation axis extends within each of the fan planes and the fan beams are directed onto the complexly formed object from fan directions which, when projected into a common plane through which the rotation axis extends, by rotation around the rotation axis, differ from each other. In this way, a restriction to the detection of an object comprising a rather low complexity only can be avoided, thereby allowing to perform the improved measurement, in particular of the complexly formed object.

According to a further embodiment, the device comprises at least three light-section measuring devices so that a first of the different fan directions points along a normal direction onto the rotation axis, a second of the different fan directions points onto the rotation axis at a first angle relative to the normal direction and a third of the different fan directions points onto the rotation axis at a second angle relative to the normal direction opposite to the first angle. In other words, the fan beams can be directed onto the complexly formed object obliquely from above, obliquely from below and substantially from the side with respect to a footprint of the device.

According to a further embodiment, the device further comprises a plurality of white light sources for illuminating the complexly formed object with substantially white light from different illumination directions, and a plurality of color imaging cameras for capturing color images of the complexly formed object from different color imaging directions. Here, the color imaging cameras and the white light sources are fixed relative to the light-section measuring devices upon rotations caused by the rotator. This configuration allows to efficiently detect a color characteristic of the complexly formed object.

According to a further embodiment, the device further comprises a controller configured to direct the rotator to continuously perform the rotation from a starting position to an end position over a rotation angle and the light-section measuring devices to periodically perform light-section measurements during the rotation, and the color imaging cameras to capture the complexly formed object at the starting position and the end position. In this way, periodically performed light-section measurements to be used for a reconstruction of a 3-dimensional shape of the complexly formed object can be obtained, while additionally, color images to be used for rendering the 3-dimensional shape of the complexly formed object can efficiently be captured. By capturing the color images at the starting position and the end position (or at two different angular positions), it is possible to provide the color images at two different view angles with respect to the rotation axis, thereby allowing to perform a complete, improved color detection of the complexly formed object.

According to a further embodiment of the present invention, a method for measuring a complexly formed object is provided.

BRIEF DESCRIPTION OF THE DRAWINGS

Embodiments of the present invention will be detailed subsequently referring to the appended drawings, in which:

FIG. 1a shows a perspective view of an embodiment of a device for measuring a complexly formed object;

FIG. 1b shows a top view of the embodiment of the device in accordance with FIG. 1a;

FIG. 2a shows a further top view of the embodiment of the device in accordance with FIG. 1a;

FIG. 2b shows a side view of the embodiment of the device in accordance with FIG. 1a;

FIG. 2c shows a further side view of the embodiment of the device in accordance with FIG. 1a.

DETAILED DESCRIPTION OF THE INVENTION

Figure 1B:
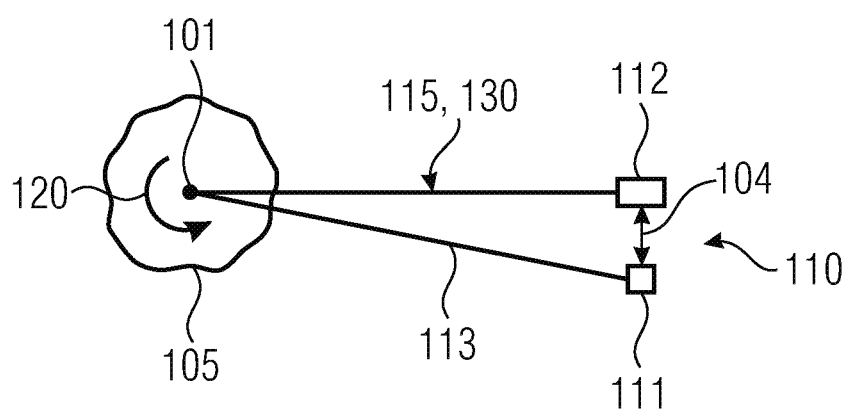

FIGS. 1a and 1b show a schematic diagram of an embodiment of a device 100 for measuring a complexly formed object 105. The device 100 comprises a plurality of light-section measuring devices 110 and a rotator (not shown) for causing a rotation 120 between the complexly formed object 105 and the plurality of light-section measuring devices 110 around a rotation axis 101. Referring to FIG. 1a, each of the plurality of light-section measuring devices 110 is configured to generate a respective fan beam 130, wherein the fan beams 130 share a common light-section plane 115 within which the rotation axis 101 extends/runs. Further referring to FIG. 1a, the plurality of light-section measuring devices 110 is configured such that the fan beams 130 are directed onto the complexly formed object 105 from different fan directions 135 extending in the common plane 115.

In embodiments, the rotation axis 101 may be oriented along a vertical direction with respect to a footprint of the device.

In embodiments, the complexly formed object 105 may be a non-convex and/or movable object. For example, the complexly formed object 105 is a plant comprising a relatively complex three-dimensional geometry and movable branches. In particular, it may have an outer surface area to volume ratio of greater than $100*1/\bar{r}$, where $\bar{r}$ is the mean extension of the object from its center of gravity.

According to embodiments, the complexly formed object 105 is a plant comprising a main axis, wherein the main axis of the plant coincides with the rotational axis 101.

According to embodiments, the plurality of light-section measuring devices 110 comprises fan generators 112 for generating the fan beams 130 on a surface of the complexly formed object 105. They may be line laser projectors.

In FIGS. 1a and 1b, the device 100 comprises three light-section measuring devices 110 so that a first 137-1 of the different fan directions 135 points along a normal direction 103 onto the rotation axis 101, a second 137-2 of the different fan directions 135 points onto the rotation axis 101 at a first angle α1 relative to the normal direction 103 and a third 137-3 of the different fan directions 135 points onto the rotation axis 101 at a second angle α2 relative to the normal direction 103 opposite to the first angle α1. Here, the normal direction 103 is essentially perpendicular to the rotation axis 101. In other words, the fan beams 130 are directed onto the complexly formed object 105 obliquely from above (along the second fan direction 137-2), obliquely from below (along the third fan direction 137-3) and substantially from the side (along the first direction 137-1) with respect to a footprint of the device 100. It is also pointed out here that the first angle α1 and the second angle α2 may have the same value or different values (with opposite signs with respect to the normal direction 103).

Further referring to the top view of FIG. 1b, each light-section measuring device 110 comprises a respective light-section imaging camera 111 positioned so as to capture the complexly formed object 105 and the light-section profile line projected thereonto, respectively, from a capturing direction 113, the projection of which onto the common plane 115 substantially coincides with a direction among the different fan directions 135 along which the fan beams 130 of the respective light-section measuring devices 110 are directed onto the complexly formed object 105. The capturing direction 113 may be defined as the optical axis of the light-section imaging camera 111. Although the capturing direction 113 is shown as crossing the rotation axis 101, this is not necessarily the case.

As can be seen in the top view of FIG. 1b, the light-section imaging cameras 111 and the fan generators 112 are typically displaced by a relatively small displacement 104.

The embodiment of the device as shown in FIGS. 1a and 1b provides the advantage that the complexly formed object can be detected as completely as possible. This means that there are substantially no regions of the complexly formed object that cannot be measured by the light-section measuring devices. In particular, the embodiment of the device as shown in FIGS. 1a and 1b allows to detect regions of the complexly formed object both on an upper side and a lower side of the same.

Embodiments of the present invention provide the further advantage that shadowing effects occurring in a light-section measurement based on a single fan direction only can be prevented or at least reduced. In case of detecting a plant, wherein, for example, the plant comprises movable branches, and wherein a fan direction for the light-section measurement is merely pointing downwards, shadowing effects will occur below the movable branches of the plant, thereby reducing the measurement accuracy.

Figure 2A:
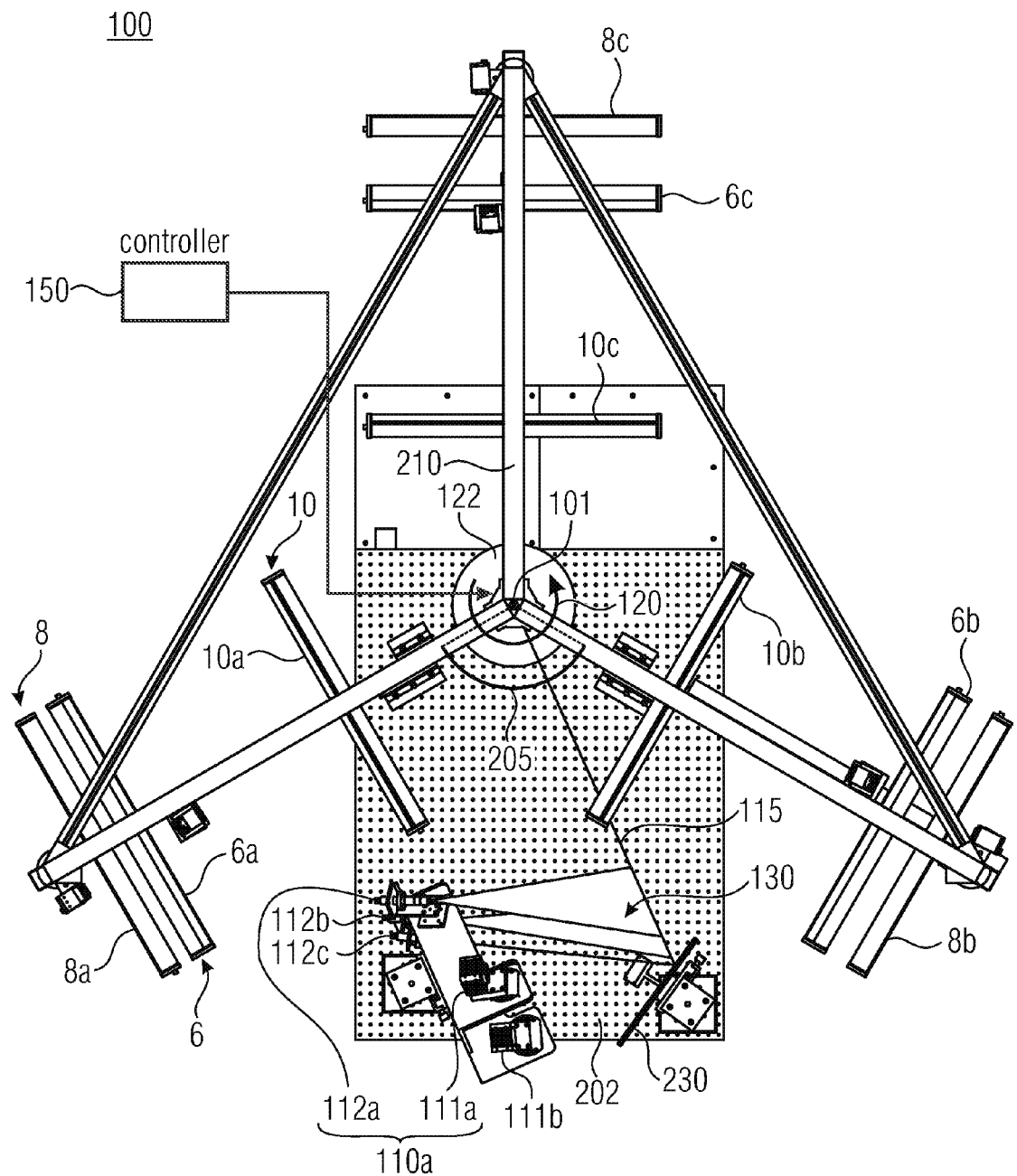
Figure 2B:
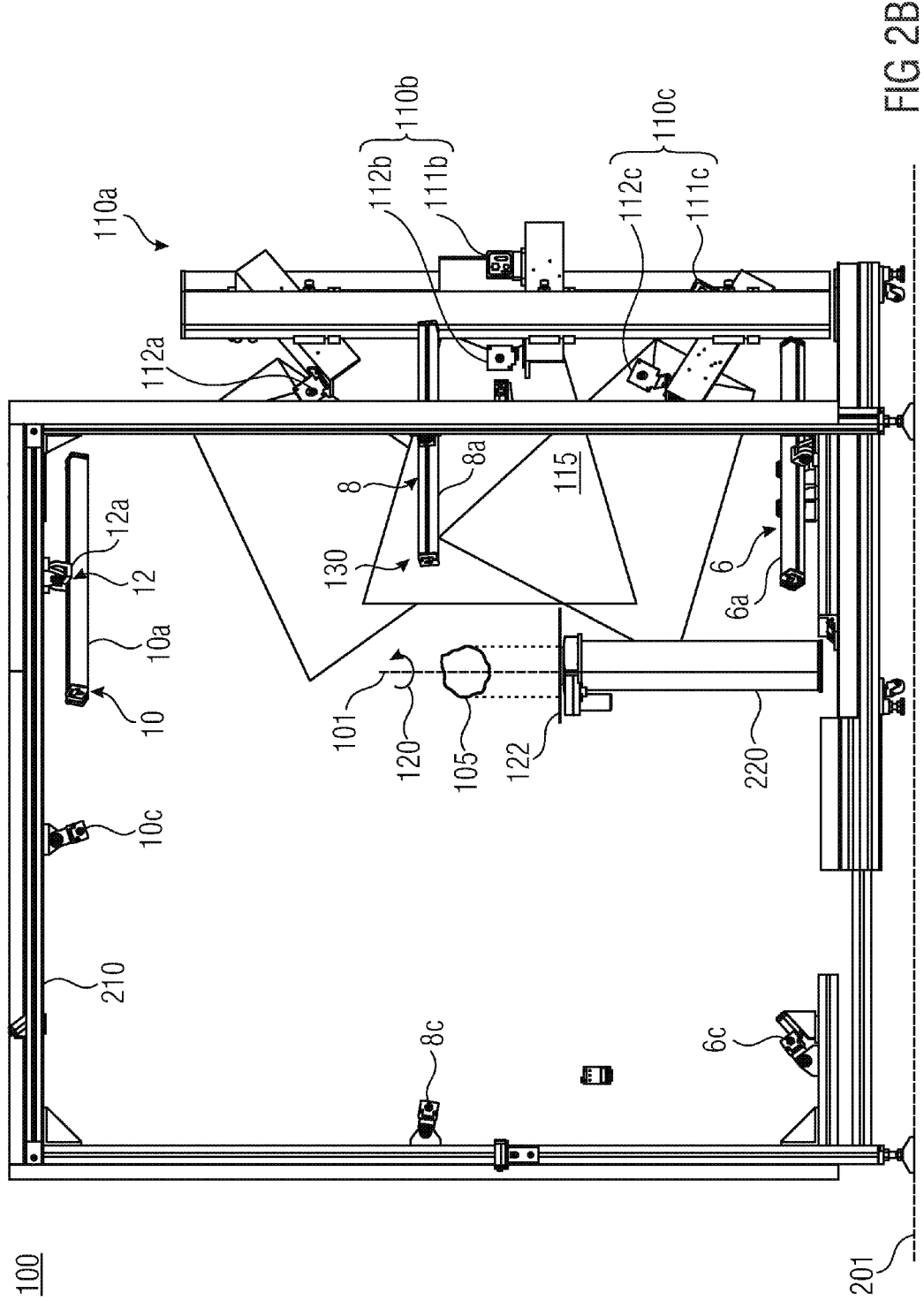

FIGS. 2a to 2c show different views of the embodiment of the device 100 in accordance with FIG. 1a. In the different views of FIGS. 2a to 2c, the elements 101, 110a to 110c, 115, 120 and 130 are shown. Here, the elements 110a to 110c, as shown in FIGS. 2a to 2c, essentially correspond to the plurality of light-section measuring devices 110 as shown in FIGS. 1a and 1b. Referring to FIGS. 2a to 2c, the elements 110a to 110c may comprise respective fan generators 112a to 112c and respective light-section imaging cameras 111a to 111c. Moreover, a rotary plate 122 (rotator) is exemplary depicted in FIGS. 2a to 2c which may perform the rotation 120 around the rotation axis 101 and on which the object may be positioned when measured. The complexly formed object 105 may also be affixed to this rotary plate 122. In particular, the device 100 as shown in FIGS. 2a to 2c comprises three light-section measuring devices 110a to 110c. Here, the three elements 110a to 110c essentially correspond to an upper light-section measuring device 110a, a middle light-section measuring device 110b and a lower light-section measuring device 110c, respectively, with respect to a footprint 201 of the device 100. As exemplarily shown in FIG. 2b, the three light-section measuring devices 110a to 110c may be configured such that the complexly formed object 105 attached to the rotary plate 122 will be probed obliquely from above, obliquely from below and substantially from the side with respect to the footprint 201. This substantially allows to achieve a rather complete probing or detection of a complexly formed object to be investigated.

In embodiments referring to FIGS. 2a to 2c, the device 100 may further comprise a plurality of white light sources 10, 8, 6 for illuminating the complexly formed object 105 with substantially white light from different illumination directions. Referring to FIGS. 2a to 2c, the plurality of white light sources 10, 8, 6 may comprise respective white light sources 10a to 10c, 8a to 8c and 6a to 6c. Here, the white light sources 10a to 10c essentially correspond to upper white light sources, the white light sources 8a to 8c essentially correspond to middle white light sources, and the white light sources 6a to 6c essentially correspond to lower white light sources, respectively, with respect to the footprint 201 of the device 100. Thus, in the embodiment of the device 100, nine white light sources 10, 8, 6 can be provided for the illumination of the complexly formed object 105. By the provision of the nine white light sources 10, 8, 6, the complexly formed object 105 can substantially be illuminated from nine different illumination directions such that a rather complete and uniform illumination of the complexly formed object 105 can be achieved with the object 105 and the device maintaining the position relative to each other.

In embodiments referring to FIGS. 2a to 2c, the device 100 may further comprise a plurality of color imaging cameras 12 for capturing color images of the complexly formed object 105 from different color imaging directions.

In particular, the plurality of color imaging cameras 12 may be associated with respective white light sources of the plurality of white light sources 10, 8, 6 so that each color imaging camera has associated therewith its own white light source. As exemplarily shown in FIG. 2b, an individual color imaging camera 12a may be associated with a corresponding white light source 10a. Thus, in the embodiment of the device 100, nine color imaging cameras 12 can substantially be employed for the capturing of the color images of the complexly formed object 105. This substantially allows to achieve a rather complete color detection of the complexly formed object 105 from the different color imaging directions. The color imaging directions may be defined as the optical axes of the color imaging cameras 12.

In embodiments, the color imaging cameras 12 may comprise color matrix cameras comprising a plurality of pixels arranged in a two-dimensional array (matrix).

In accordance with the above description, the device 100 may therefore further comprise a plurality of white light sources 10, 8, 6 for illuminating the complexly formed object 105 with substantially white light from different illumination directions and a plurality of color imaging cameras 12 for capturing color images of the complexly formed object 105 from different color imaging directions. Here, the color imaging cameras 12 and the white light sources 10, 8, 6 are fixed relative to the light-section measuring devices 110 upon rotations 120 caused by the rotator. The plurality of white light sources 10, 8, 6 and the plurality of color imaging cameras 12 can be fixed to a support structure 210, while the rotary plate 122 can be attached to a ground plate 202 of the device 100 via a support member 220 (see FIGS. 2a and 2b).

As schematically depicted in FIG. 2a, the fan beams 130 generated from the light-section measuring devices (e.g., light-section measuring device 110a comprising the light projector 112a and the light-section imaging camera 111a) can be re-directed or reflected onto the common plane 115 by using corresponding optical reflection elements such as reflection mirrors one of which is representatively shown for the fan generator 112c.

In embodiments, the plurality of color imaging cameras 12 are distributed such that a projection of all different color imaging directions angled at an angle relative to the rotation axis 101, which is within a predetermined angle range, onto a plane perpendicular to the rotation axis 101 have a mean angle distance 205 around the rotation axis 101 which is between 45° and 180°, both exclusively. The mean angle distance 205 around the rotation axis 101 is exemplarily depicted in FIG. 2a. According to embodiments, the predetermined angle range is at least 20° wide. In particular, in FIG. 2a, this condition holds true for any angle range which is 20° wide and accommodates any of the color imaging directions.

In the embodiment of the device 100 with regard to FIG. 2a, the plurality of color imaging cameras 12 may be equally distributed by a mean angle distance 205 of 120° as far as the upper, middle and lower color imaging cameras 12 are concerned, respectively. For example, the plurality of color imaging cameras 12 can substantially be positioned at example angular positions of 0°, 120° and 240° with respect to the rotation axis 101.

Further referring to FIG. 2a, the device 100 may further comprise a controller 150 configured to direct the rotator to continuously perform the rotation 120 from a starting position to an end position over a rotation angle and the light-section measuring devices 110 to periodically perform light-section measurements during the rotation 120, and the color imaging cameras 12 to capture the complexly formed object 105 at the starting position and the end position. By this configuration, the light-section measurements may be periodically performed and then used for a reconstruction of a 3D shape of the complexly formed object 105. The color images from color imaging cameras 12 may be used for rendering the appearance (such as color and/or luminance/brightness) of the outer surface of the 3D shape of the complexly formed object 105.

In embodiments, the controller 150 may be configured to direct the rotator such that a rotation angle larger or equal to 360° will be obtained so that the object is completely scanned from all directions by the light-section measuring device.

Advantageously, however, the rotation angle over which the rotation 120 is performed is 360° plus ¼ to ¾ of the mean angle distance 205. In an embodiment, the rotation angle is 360° plus ½ of the mean angle distance 205 such as 360° plus ½*120° being equal to 420° with respect to the rotation axis 101. This enables that the color imaging cameras 12 may efficiently capture the object at two different view angles with respect to the rotational axis 101.

For example, the controller 150 may be configured to direct the rotator such that in a first color imaging capturing phase, the plurality of color imaging cameras 12 will substantially be positioned at first angular positions of 0°, 120° and 240° with respect to the rotation axis 101, and in a second color imaging capturing phase, the plurality of color imaging cameras 12 will substantially be positioned at second angular positions of 60°, 180° and 300° with respect to the rotation axis 101. In this way, it is possible to capture the color images of the complexly formed object 105 in the first and the second color imaging capturing phases from different view angles angularly displaced by a rotation angle of 60°, respectively.

In further embodiments, the controller 150 may be configured to direct the rotator such that the performed rotation 120 will be characterized by a single acceleration phase, a single deceleration phase and a uniform phase in between. By the provision of such a rotation characteristic, it is possible to prevent or at least reduce measuring artifacts or degraded light-section measurements caused by a rocking motion of a movable, complexly formed object to be investigated. This is especially important for the detection of plants comprising movable branches.

In embodiments, the controller 150 of the device 100 is configured to perform the periodic light-section measurements during the rotation 120 within the rotation angle of 360° only. The rotation angle of 360° may lie anywhere between starting and end angle (position) and advantageously in the middle of the interval between starting and end angle in order to prevent rocking motions of the object negatively affecting the measurement accuracy.

In embodiments, the device 100 may further comprise a reconstructor configured to determine a 3D shape of the complexly formed object 105 from the light-section measurements of the light-section measuring devices 110, and a renderer configured to render the 3D shape of the complexly formed object 105 by using the color images captured by the color imaging cameras 12.

Figure 3:
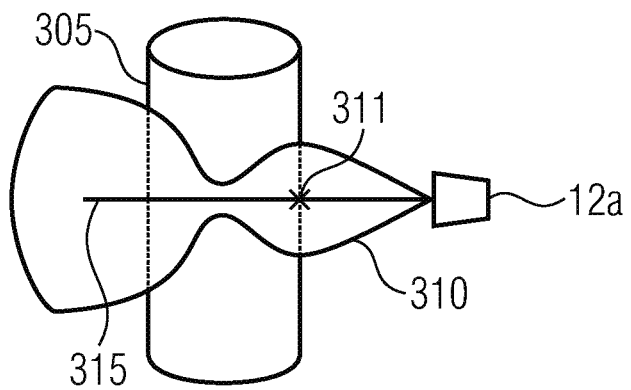
FIG. 3 shows a schematic illustration of how to map color information obtained from color images captured by a color image camera onto an outer surface of a reconstructed 3D model.

FIG. 3 shows a schematic illustration of how to map color information of the color images captured by a color image camera (e.g., the color image camera 12a as exemplarily shown in FIG. 2b) onto an outer surface of a reconstructed 3D model of the object as reconstructed from the light-section measuring devices 110. In the schematic illustration of FIG. 3, an example color imaging camera 12a is shown illustratively as comprising a cone-shaped field of view 310. FIG. 3 also shows a maximally covered light-section measuring zone within which the 3D shape of the complexly formed object 105 can be detected by the light-section measuring devices 110. Advantageously, the field of view 310 covers the whole zone 305 although otherwise shown in FIG. 3 for ease of illustration. The determined 3D shape of the complexly formed object obtained from the reconstruction represents a reconstructed 3D model such as, for example, a 3D grid. The color imaging camera 12a is configured for capturing a 2D color image of the complexly formed object 105 from a certain color imaging direction as described above. During rotation 120 by the rotator, the color imaging cameras 12 are positioned fixedly with respect to the light-slight measuring devices 110, and the color imaging direction has a known orientation with respect to the zone 305 in which the 3D model is defined. The color image captured by the color imaging camera 12a comprises a plurality of pixels arranged in a 2D array. By calibration, it can be determined for each pixel of the 2D color image captured by the color imaging camera 12a, which light path traveling through the zone 305 is associated with which pixel of the captured 2D color image, or which light path traveling through the zone 305 is imaged by the color imaging camera 12a lens onto which pixel. In the schematic illustration of FIG. 3, an example captured light path 315 associated with a certain pixel of the 2D color image obtained from the color imaging camera 12a is shown, extending through the maximally covered light-section measuring zone 305. According to embodiments, the color information obtained from this pixel can be mapped onto the outer surface of the reconstructed 3D model by determining the intersection point 311 between the outer surface of the 3D model and the captured light path 315 which is nearest to the color imaging camera 12a and subsequently assigning the color information obtained from the pixel to this intersection point 311. This can be performed for all the pixels of the captured 2D color image such that the outer surface of the 3D model can be rendered by using the captured color information.

In further embodiments, the rotation axis 101 of the device 100 may be oriented along any other direction which is different from the vertical direction with respect to the footprint of the device 100.

In further embodiments, the device 100 may comprise two, four or more light-section measuring devices 110.

To summarize, the embodiment of the device 100 represents a measuring device which allows to perform an improved measurement, in particular of a complexly formed object. The underlying principle of the inventive measuring device is to record the 3D measuring data during a rotatory relative movement between the complexly formed object such as a plant and the measuring arrangement comprising the plurality of light-section measuring devices. In the case of detecting a plant, the axis of rotation is advantageously approximately flush with the axis of symmetry of the plant, i.e., with the trunk of the plant. The 3D measuring data for reconstructing the 3D shape of the complexly formed object can be generated by means of the laser light-section method, wherein simultaneously three line laser camera pairs (light-section triples) detect the complexly formed object or plant from different directions, so that as complete imaging as possible of the complexly formed object or plant is enabled. The light fans or fan beams of the line laser projectors can be aligned such that all of the fan beams are located within a common plane (laser plane), and that the rotation axis of the relative movement is located within the laser plane. Thus, with typically upright plants, for example, the rotation axis of the movement and the laser plane are also upright. In particular, by a suitable arrangement and alignment of the individual light-section units or light-section measuring devices, it can be achieved that complexly formed objects or plants can be detected as completely as possible, i.e., without any appreciable non-measurable regions. In this context, it is possible and makes sense to take into account the respective specific plant architecture. With the light-section units, the advantageous arrangement is such that one unit captures the complexly formed object or plant from an oblique low position, one unit captures it in a horizontal direction and one unit captures it from an oblique top position. In this manner, one can achieve, for example, that the area below the leaves as well as the undersides of the leaves and the upper area of the leaves, which typically tapers toward the inside, may be captured.

A full three-dimensional measuring of the complexly formed object such as a plant can be performed during a rotational relative movement between the complexly formed object or plant and the light-section measuring devices of at least 360°. The angular distance between the individual light-section measurements during such a scan operation can be selected such that the measuring points in the outermost area of the plant, i.e., those areas having the largest radius during the rotational motion, do not exceed a specific distance, so that for the entire measurement, a complete detection of the complexly formed object or plant at a minimum resolution is ensured. With the light-section measuring cameras (light-section imaging cameras) and laser line projectors currently available, repetition frequencies of the light-section measurement in the kilohertz range are possible in this manner so that, for example, a complete rotational scan over 360° with plants having a diameter of approximately one meter is possible at a measuring resolution of less than one millimeter in a few seconds. In order to be independent of variations of the rotational speed during the acceleration ramps of a rotation caused by the rotator, the light-section imaging cameras can be supplied with a trigger signal by the rotation axis itself or by a rotary encoder, said trigger signal being used for the resolution of the respective light-section measurement on the individual cameras.

For the detection of the color characteristic of the complexly formed object or plant (for recognizing diseases or states of stress, for example), color matrix cameras in combination with suitably positioned white light sources can be employed with the inventive device. In order to achieve as complete color detection of the complexly formed object or plant as possible, a total of nine cameras and as many white light sources can typically be employed, the white light sources not being associated with specific cameras. The color cameras can be positioned so that they are located in groups of three (triples) around the complexly formed object or plant, wherein within one triple, the cameras are arranged one above the other in the vertical direction, and wherein the capturing direction of the bottom most camera is aligned obliquely upward, the capturing direction of the central camera is aligned roughly horizontal and the capturing direction of the top most camera is aligned obliquely downward. For example, the exact alignment may take into account the specific architecture of a plant to be detected so as to be able to detect as large of a part of the plant as possible. The camera triples can be arranged, in relation to the rotation axis, at a (mean) angular distance of 120°, so that with a simultaneous capturing of the color data at any instant of time, a total of 9 views will be created, each of which is aligned under 120° in relation to the rotation axis.

Since a complete color detection of a complexly formed object or plant typically necessitates more than said nine view from 120°, further color images can be captured with all of the color imaging cameras at a second instant in time and, thus, at a different angle in relation to the rotation axis.

One particular difficulty in detecting the rotational movement of plants, for example, consists in that the plants per se and, above all, the plant leaves are highly mechanically flexible which is why they will perform a deflection and a subsequent proper motion (rocking motion) when they are accelerated. For this reason, one can ensure by means of the measuring cycle that the rotational acceleration will not lead to measuring artifacts (incorrect measurements). This can be achieved by applying as small of an acceleration as possible at the start and the end of the rotation. However, a small rotational acceleration conflicts with a short light-section measuring time. For this reason, one can select a measurement sequence wherein only one single acceleration phase and one deceleration phase and one interposed rotational movement being as uniform as possible will take place.

Especially due to the mechanical instability of plants, it can be advantageous to align the rotation axis to be perpendicular if the plant is to be rotated. However, if the measuring means or light-section measuring devices are rotated around the plant, the rotation axis can be aligned in the direction of the main axis of the plant.

To minimize the overall capturing time for detecting a plant, for example, a measurement sequence can be selected wherein once the plant has been introduced into the measurement setup and/or once the measurement setup has been positioned around the plant in the case of stationary plants, a color image is initially captured by means of the nine color imaging cameras, subsequently, the rotational movement is performed for recording the 3D light-section data (light-section measurements) over 360° and, subsequently, the rotational movement is not stopped but continued until the 420° position is stopped there and a second color image is captured while using all of the nine color imaging cameras. In this manner one achieves that one may not only generate color data from the angular positions at 0°, 120° and 240° but also at 60°, 180° and 300°.

In order to realize as compact a measurement setup as possible for a relatively large plant, for example (e.g., having a height of one meter and a diameter of one meter), optical mirrors can be employed for redirecting the laser fan beams as it is indicated in the figures.

For very high plants, for example, utilization of nine color imaging cameras and of three light-section measuring devices may not be sufficient. In order to fully detect the plant, the measuring devices and/or the plant can be shifted once the above-described measuring sequence has finished, in the direction of the rotation axis, and a further measuring sequence can be started. This may be repeated any number of times as necessitated. A further possibility is to use additional color imaging cameras and light-section measuring devices. The described color imaging camera triples can be arranged one above the other with an overlap if necessitated, wherein the overlap serves to detect all of the leaves on the upper and lower surfaces. Accordingly, the described light-section measuring devices can be arranged vertically one above the other. In order to avoid mutual disruption of light-section triples arranged one above the other (each of which consists of three light-section measuring devices), they may either be offset by an angle in relation to the rotation axis or, alternatively, different wavelengths of the laser line projectors may be employed. By employing suitable optical filters, only the corresponding wavelengths of the associated light-section imaging cameras will be detected.

The control of the whole measuring cycle relates to all of the mechanical and electrical components. It is performed by a control computer or by an SPS (PLC).

In the following, a time sequence of the measuring operation is exemplarily described. The time sequence of the measuring operation may comprise the following steps.

A first step may comprise positioning the complexly formed object or plant in the measuring device or positioning the measuring device in relation to the complexly formed object or plant, so that the main axis of the complexly formed object or plant roughly corresponds to the rotation axis of the measuring device. A second step may comprise switching on the white light sources. A third step may comprise triggering the color image capture with nine color imaging cameras (2D cameras) and storing the data. A fourth step may comprise switching off the white light sources such that the light-section measuring devices will not be influenced by the white light, and switching on the laser line projectors. A fifth step may comprise starting the light-section measuring devices. A sixth step may comprise starting the rotational movement with a defined acceleration ramp. A seventh step may comprise capturing and storing the 3D data of the light-section imaging cameras over the entire rotation operation of at least 360°. An eighth step may comprise stopping the rotational movement at the 420° position and switching off the light-section measuring devices. A ninth step may comprise switching on the white light sources. A tenth step may comprise triggering the color image capture with the color imaging cameras (2D cameras) and storing the data. An eleventh step may comprise switching off the white light sources. A twelfth step may comprise removing the complexly formed object or plant measured, and introducing the next complexly formed object or plant to be measured, or repositioning the measuring device. A thirteenth step may comprise reconstructing the complexly formed object or plant on the basis of the 3D data and color images.

In summary, embodiments of the present invention provide a device and method for a contactless three-dimensional and color detection of complexly formed objects or plants, the 3D measurement being performed by means of several light-section measuring devices and the color detection being performed by means of color imaging cameras (2D cameras), and a relative rotational motion being performed between the complexly formed object or plant and the measuring device for the 3D measurement.

In an embodiment, the lasers are aligned such that for each laser, the rotation axis of the relative motion lies within the plane of the laser fan beam.

In a further embodiment, the main axis of the complexly formed object or plant roughly coincides with the rotation axis.

In a further embodiment, all of the laser fan beams are located within a common plane.

In a further embodiment, the color image capture is performed prior to and subsequent to the 3D measurement.

In a further embodiment, in the case of a total of nine color imaging cameras, the three color camera triples are mutually arranged at 120° (in relation to the rotation axis).

In a further embodiment, two color image captures can be used, wherein between the first and second color image captures, an angular displacement of 60° with respect to the rotation axis is implemented so that, in total, color images are produced from views of 0°, 60°, 120°, 180°, 240° and 300° and therefore the angular displacement between the color images with respect to the rotation axis is constant.

The inventive concept described here enables automatic contactless detection of the three-dimensional geometry and of the color appearance of complexly formed objects or plants. In the case of detecting plants, the purpose consists of automatically detecting and evaluating the plants in terms of their shapes and states of vitality at the respective stage of growth. Embodiments of the invention provide the advantage that it becomes possible to achieve as complete a detection as possible of relatively complex and large plants such as adult plants, for example, which are used for producing pharmaceutical preparations within as short an imaging duration as possible. With the embodiment of the device and its characteristics, plants may be detected almost completely within a few seconds. The embodiment of the device is operated within a greenhouse environment in such a manner that the plants are transported in their plant pots to the measuring device by means of a transport system. One possible implementation is a measuring arrangement that may be positioned in the field or in the greenhouse by transport means to the individual plants.

The improvement achieved with embodiments of the present invention results from the special imaging geometry and from the optimized measurement sequence. This enables largely complete scanning of the three-dimensional shape and color of complex plants within an imaging duration of a few seconds and at a relatively small number of necessitated camera systems and of mechanical components.

The technical field of application of the inventive embodiment includes, on the one hand, phenotyping of plant varieties in research and development in the field of plant breeding and, on the other hand, quality assurance in industrial plant production, e.g., in the pharmaceutical industry.

Figure 4:
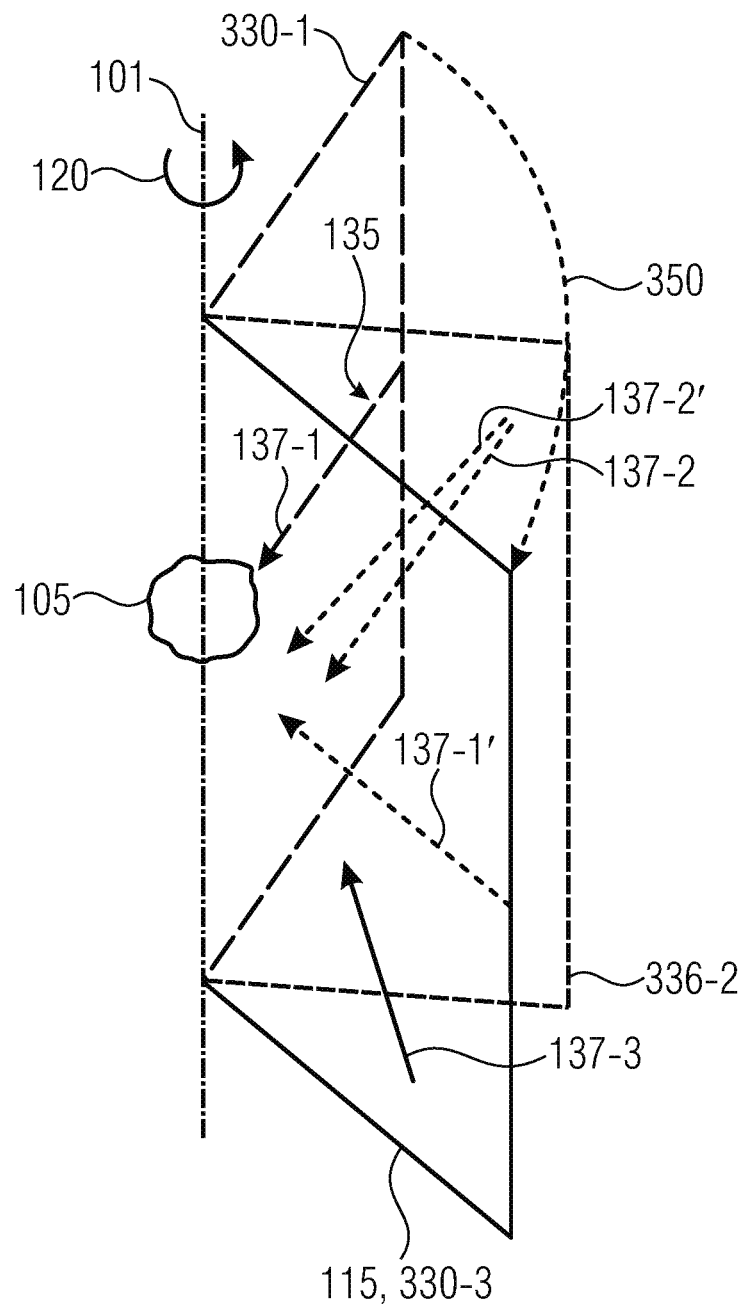
FIG. 4 shows another perspective view of an embodiment of a device for measuring a complexly formed object.

With reference to FIGS. 1a,b, 2a-c and 3, it was exemplarily described that the fan beams share a common light-section plane within which the rotation axis extends and are directed onto the complexly formed object from different fan directions extending in the common plane. A more general (and flexible) solution, however, is depicted in FIG. 4. According to this solution, the fan beams do not necessarily share a common light-section plane within which the rotation axis extends.

FIG. 4 shows another perspective view of an embodiment of a device for measuring a complexly formed object. In the perspective view of FIG. 4, a plurality of fan planes 330-1, 330-2, 330-3 are shown, wherein the fan planes 330-1, 330-2, 330-3 are arranged such that the rotation axis 101 extends within each of the fan planes 330-1, 330-2, 330-3. The fan beams 130 which are generated in the respective fan planes by the light-section measuring devices 110 are not shown in FIG. 4 for ease of illustration.

FIG. 4 shows the fan directions 135 comprising the first fan direction 137-1, the second fan direction 137-2 and the third fan direction 137-3. For example, the first fan direction 137-1 is associated with a first fan plane 330-1, the second fan direction 137-2 is associated with a second fan plane 330-2, and the third fan direction 137-3 is associated with a third fan plane 330-3. Referring to FIG. 4, the fan directions 135, when projected into a common plane 115 (e.g., along a projection direction 350) through which the rotation axis 101 extends, by rotation 120 around the rotation axis 101, differ from each other. The projected different fan directions associated with the common plane 115 are indicated by the numerals 137-1', 137-2', wherein the projected fan direction 137-1' corresponds to the first fan direction 137-1, while the projected fan direction 137-2' corresponds to the second fan direction 137-2.

It is further pointed out here that in the solution of FIG. 4 showing the different fan planes 330-1, 330-2, 330-3, a light-section measurement performed with one of the plurality of light-section measuring devices 110 could inadvertently be influenced by a light-section measurement performed with another of the plurality of light-section measuring devices 110. For example, the light-section measuring device for generating the fan beam in the third fan direction 137-3 and for capturing the complexly formed object 105 and the profile line on it in the third fan plane 330-3 may also unintentionally capture a second profile line generated by a further different light-section measuring device such as the one generating the fan beam in the second fan plane 330-2 if the measurements are performed concurrently.

In order to avoid interferences, it is possible to provide specific light-section measuring devices 110 which operate at different frequency bands (or different laser wavelengths of the laser line projectors) or which operate in an intermediate cycling mode. The operation in the intermediate cycling mode is, for example, characterized in that the light-section measurements by the light-section measuring devices for the different fan directions (i.e., the first fan direction 137-1, the second fan direction 137-2 and the third fan direction 137-3) are performed successively cyclically for the different fan directions 137-1, 137-2, 137-3.

By the provision of different frequency bands for the different light-section measuring devices 110, the just-mentioned interference of the measurement accuracy can be avoided. The same effect is essentially achieved with the operation of the light-section measuring devices 110 in the intermediate cyling mode.

With respect to the description brought forward above, the following is noted. As one solution for capturing the color of the complexly formed object, it was described above with respect to FIGS. 2a to 2c that it is possible to arrange, in a distributed manner, a plurality of pairs of cameras and light sources around the complexly formed object in order to perform respective color capturing measurements at the starting and end position between which the complexly formed object is continuously moved/rotated in order to perform the light-section measurements. However, different solutions are also feasible. For example, it could be that color measurement on the one hand and light-section measurement on the other hand are rendered not interfering with each other by choosing the spectrum of the white light sources to not overlap or be distinct to the sensitivity spectrum of the light-section imaging cameras and the spectrum of the light-section fan generators to not overlap with, or be distinct from, the sensitivity spectrum of the color imaging cameras. In that case, for example, the triplet of white light sources 6a, 8a in combination with the respective color imaging cameras 12 could be sufficient in order to perform the color measurement. The other cameras and white light sources in the embodiment of FIGS. 2a to 2c could be omitted. Color measurement and light-section measurement would be done in parallel. The illumination by the white light sources 10a, 10b and 10c could be done in parallel. The illumination by the white light sources 10a, 10b and 10c could be done stroboscopically or using light flashes in order to achieve a short picture integration time and avoid smear effects due to the movement of the object during the picture capturing by the color imaging cameras. Alternatively, however, continuously operating white light sources may also suffice depending on the sensitivity of the color imaging cameras used. In any case, walking movements of the object are avoided by allowing the object to be moved continuously rather than via a stop-and-go procedure.

In both of the above mentioned cases, i.e. performing the color measurement at the starting and end position or performing the color measurement in parallel to the light-section measurement, it would be possible to perform the picture capturing from the different color imaging directions in parallel or serially. A serial performance would avoid inconsistencies due to shadows caused in the field of view of one color imaging camera by the white light source associated with another color imaging camera.

Finally, with respect to the aforementioned 3D shape reconstruction of the object the following is noted. Depending on the object of interest, it might be that despite the provision of different light-section measurement directions 137, a large portion of the outer surface of the object remains un-sampled. That is, for this portion no 3D surface point is obtained by way of the light-section measurements within measurement zone 305. However, in that case it might be that the application does not necessitate a complete reconstruction of the outer surface of the object. Imagine, for example, a plant like a fichus or the like, the leaves of which are oriented in different directions and occlude each other so that even the different light-section measurement directions do not completely disocclude the complete outer surface of the plant. In that case, an alternative way of evaluating the 3D sample points of the outer surface of the object as obtained by the light-section measurements would be to first of all cluster these 3D points within zone 305 into different groups so that each group represents one leaf of the plant. For each of these groups/leaves, a parameterizable 3D model of a plant's leaf is then fitted into the 3D sample points belonging to the respective group/leaf. In order to perform the fit, the color images obtained by the color imaging cameras may be used as well. For example, some of the leaf's parameters may determine the lateral shape and size of the leaf whereas others may relate to a curvature of the leaf. The fit of the leaf's 3D model may be done to render the leafs 3D model conforming to both the 3D sample points obtained by the light-section measurement as well as an outer circumference of the projection of the respective leaf onto the one or more color imaging cameras. Thus, the following procedure may be performed:

1) The 3D sample points of the object are gathered from the light-section measurements.
2) Then, the 3D sample points are grouped to individually correspond to a leaf of the plant.
3) Then, 3D parameters are determined for the individually leaves. For a predetermined leaf, the following steps are performed.
3a) In at least one color imaging camera, the outer circumference or boundary of the respective leaf is found in the respective picture captured by the respective color imaging camera. For example, the 3D sample points of the respective group/leaf as obtained by the light-section measurement are projected onto the image plane/picture of the respective color imaging camera, and using edge detection the outer circumference in the picture/projection of the leaf is determined.
3b) The parameters of the leaves 3D model are determined so that the 3D model conforms or leads through the 3D sample points and so that an outer circumference of a projection of the leaves 3D model conforms to the boundary found in the picture captured by the respective color imaging camera.

As far as the aforementioned fit is concerned, it is noted that same may be in one step or iteratively. For example, the fit may first be done to fit the leaf's 3D model to the 3D sample positions and then revising the parameters to conform to the boundary in the picture of the respective color imaging camera. However, it should also be noted that it would be feasible to perform the fit merely using the 3D light-section sample points rather than also using the boundary found in the picture of any color imaging camera.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A device for measuring a complexly formed object, comprising:
   a plurality of light-section measuring devices;
   a rotator for causing a rotation between the complexly formed object and the plurality of light-section measuring devices around a rotation axis;
   wherein each of the plurality of light-section measuring devices is configured to generate a respective fan beam in a respective fan plane, wherein the fan planes are arranged such that the rotation axis extends within each of the fan planes;
   wherein the plurality of light-section measuring devices is configured such that the fan beams are directed onto the complexly formed object from fan directions which, when projected into a common plane through which the rotation axis extends, by rotation around the rotation axis, differ from each other,
   wherein the device further comprises
   a plurality of color imaging cameras for capturing color images of the complexly formed object from different color imaging directions;
   a controller configured to direct the rotator to continuously perform the rotation from a starting position to an end position over a rotation angle and the light-section measuring devices to periodically perform light-section measurements during the rotation, and the color imaging cameras to capture the complexly formed object at the starting position and the end position;
   a reconstructor configured to determine a 3D shape of the complexly formed object from the light-section measurements of the light-section measuring devices, and a renderer configured to render the 3D shape of the complexly formed object by using the color images captured by the color imaging cameras,
   wherein the complexly formed object is a plant and the reconstructor is configured to group 3D sample points of the complexly formed object acquired by the light-section measurements to individually correspond to a leaf of the plant, and to determine 3D parameters of a parametrizable 3D leaf object for the individual leaves by fitting the 3D leaf object to the 3D sample points.

2. The device according to claim 1, wherein the fan planes are co-planar and define the common plane.

3. The device according to claim 1, wherein the light-section measuring devices are configured to operate at different frequency bands or operate in an intermediate cycling mode.

4. The device according to claim 1, wherein the device comprises at least three light-section measuring devices so that a first of the different fan directions points along a side direction onto the rotation axis which is angled with respect to the rotation axis between 60° and 120°, a second of the different fan directions points onto the rotation axis at a first angle relative to the side direction and a third of the different fan directions points onto the rotation axis at a second angle relative to the side direction pointing opposite to the first angle.

5. The device according to claim 1, wherein each light-section measuring device comprises a respective light-section imaging camera positioned so as to capture the complexly formed object from a capturing direction, the projection of which onto the common plane substantially coincides with a direction among the different fan directions along which the fan beams of the respective light-section measuring devices are directed onto the complexly formed object.

6. The device according to claim 1, further comprising a plurality of white light sources for illuminating the complexly formed object with substantially white light from different illumination directions.

7. The device according to claim 1, further comprising a plurality of color imaging cameras for capturing color images of the complexly formed object from different color imaging directions.

8. The device according to claim 1, wherein the different illumination directions and the different color imaging directions coincide so that the color imaging cameras view the complexly formed object substantially from a side from which the complexly formed object is lit by the color imaging cameras.

9. The device according to claim 8, wherein the plurality of color imaging cameras are distributed such that a projection of all different color imaging directions angled at an angle relative to the rotation axis, which is within a predetermined angle range, onto a plane perpendicular to the rotation axis comprise a mean angle distance around the rotation axis which is between 45° and 180°, both exclusively.

10. The device according to claim 9, wherein the predetermined angle range is at least 20°.

11. The device according to claim 9, wherein the plurality of color imaging cameras are equally distributed by a mean angle distance of 120°.

12. The device according to claim 1, wherein the plurality of color imaging cameras are distributed such that a projection of all different color imaging directions angled at an angle relative to the rotation axis, which is within a predetermined angle range, onto a plane perpendicular to the rotation axis comprise a mean angle distance around the rotation axis which is between 45° and 180°, both exclusively, and wherein the rotation angle is 360° plus ¼ to ¾ of the mean angle distance.

13. The device according to claim 9, further comprising a plurality of white light sources for illuminating the complexly formed object with substantially white light along the different color imaging directions in a first frequency band which does not overlap with a sensitivity band of the light-section measuring devices, and a controller configured to direct the rotator to continuously perform the rotation from a starting position to an end position over a rotation angle and the light-section measuring devices to periodically perform light-section measurements, and the color imaging cameras to capture the complexly formed object during the rotation.

14. The device according to claim 1, wherein the controller is configured to perform the periodic light-section measurements during the rotation within the rotation angle of 360° only.

15. A device for measuring a complexly formed object, comprising:
a plurality of light-section measuring devices;
a rotator for causing a rotation between the complexly formed object and the plurality of light-section measuring devices around a rotation axis;
wherein each of the plurality of light-section measuring devices is configured to generate a respective fan beam in a respective fan plane, wherein the fan planes are arranged such that the rotation axis extends within each of the fan planes;
wherein the plurality of light-section measuring devices is configured such that the fan beams are directed onto the complexly formed object from fan directions which, when projected into a common plane through which the rotation axis extends, by rotation around the rotation axis, differ from each other,
wherein the device further comprises
a plurality of color imaging cameras for capturing color images of the complexly formed object from different color imaging directions;
a controller configured to direct the rotator to continuously perform the rotation from a starting position to an end position over a rotation angle and the light-section measuring devices to periodically perform light-section measurements during the rotation, and the color imaging cameras to capture the complexly formed object at the starting position and the end position;
a reconstructor configured to determine a 3D shape of the complexly formed object from the light-section measurements of the light-section measuring devices, and a renderer configured to render the 3D shape of the complexly formed object by using the color images captured by the color imaging cameras,
wherein the complexly formed object is a plant and the reconstructor is configured to group 3D sample points of the complexly formed object acquired by the light-section measurements to individually correspond to a leaf of the plant, and to determine a boundary of the leaves in a picture acquired from a predetermined one of the color imaging cameras and 3D parameters of a parametrizable 3D leaf object for the individual leaves by fitting the 3D leaf object to the 3D sample points and a projection of the 3D leaf object onto the predetermined color imaging camera to the boundary.

16. A method for measuring a complexly formed object, comprising:
providing a plurality of light-section measuring devices;
causing a rotation between the complexly formed object and the plurality of light-section measuring devices around a rotation axis;
wherein each of the plurality of light-section measuring devices is configured to generate a respective fan beam in a respective fan plane, wherein the planes are arranged such that the rotation axis extends within each of the fan planes;
wherein the plurality of light-section measuring devices is configured such that the fan beams are directed onto the complexly formed object from fan directions which, when projected into a common plane through which the rotation axis extends, by rotation around the rotation axis, differ from each other;

wherein a plurality of color imaging cameras capture color images of the complexly formed object from different color imaging directions; and the rotator is directed to continuously perform the rotation from a starting position to an end position over a rotation angle and the light-section measuring devices to periodically perform light-section measurements during the rotation, and the color imaging cameras to capture the complexly formed object at the starting position and the end position, a 3D shape of the complexly formed object is determined from the light-section measurements of the light-section measuring devices, and the 3D shape of the complexly formed object is rendered by using the color images captured by the color imaging cameras, the complexly formed object is a plant, and the reconstructing comprises grouping 3D sample points of the complexly formed object acquired by the light-section measurements to individually correspond to a leaf of the plant, and determining 3D parameters of a parametrizable 3D leaf object for the individual leaves by fitting the 3D leaf object to the 3D sample points.

* * * * *